United States Patent
Bornea et al.

(10) Patent No.: US 9,280,585 B2
(45) Date of Patent: Mar. 8, 2016

(54) METHOD AND APPARATUS FOR OPTIMIZING THE EVALUATION OF SEMANTIC WEB QUERIES

(71) Applicant: International Business Machines Corporation, Armonk, NY (US)

(72) Inventors: Mihaela Ancuta Bornea, White Plains, NY (US); Julian Timothy Dolby, Bronx, NY (US); Anastasios Kementsietsidis, New York, NY (US); Kavitha Srinivas, Rye, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/680,705

(22) Filed: Apr. 7, 2015

(65) Prior Publication Data
US 2015/0213089 A1    Jul. 30, 2015

Related U.S. Application Data

(63) Continuation of application No. 13/856,428, filed on Apr. 3, 2013, now Pat. No. 9,031,933.

(51) Int. Cl.
G06F 17/30    (2006.01)
(52) U.S. Cl.
CPC .... *G06F 17/30466* (2013.01); *G06F 17/30463* (2013.01); *G06F 17/30657* (2013.01); *G06F 17/30958* (2013.01)
(58) Field of Classification Search
CPC ................................................. G06F 17/30466
USPC ......................................................... 707/718
See application file for complete search history.

(56) References Cited

U.S. PATENT DOCUMENTS

| | | | |
|---|---|---|---|
| 5,909,678 A | 6/1999 | Bergman et al. | |
| 7,254,589 B2 * | 8/2007 | Goodwin | G06F 8/71 |
| 7,617,179 B2 * | 11/2009 | Nica | G06F 17/30466 |

(Continued)

FOREIGN PATENT DOCUMENTS

WO    2012135851 A    10/2012

OTHER PUBLICATIONS

"4store—scalable RDF storage," http://4store.org/http://4store.org/.
(Continued)

*Primary Examiner* — Noosha Arjomandi
(74) *Attorney, Agent, or Firm* — George Willinghan

(57) ABSTRACT

A semantic query over an RDF database is received with RDF database statistics and access methods for evaluating triple patterns in the query. The semantic query is expressed as a parse tree containing triple patterns and logical relationships among the triple patterns. The parse tree and access methods create a data flow graph containing a plurality of triple pattern and access method pair nodes connected by a plurality of edges, and an optimal flow tree through the data flow graph is determined such that costs are minimized and all triple patterns in the semantic query are contained in the optimal flow tree. A structure independent execution tree defining a sequence of evaluation through the optimal flow tree is created and is transformed into a database structure dependent query plan. This is used to create an SQL query that is used to evaluate the semantic query over the RDF database.

16 Claims, 7 Drawing Sheets

(56) References Cited

U.S. PATENT DOCUMENTS

| | | | |
|---|---|---|---|
| 7,765,176 B2* | 7/2010 | Simmons et al. | 706/45 |
| 7,899,861 B2 | 3/2011 | Feblowitz et al. | |
| 8,032,525 B2 | 10/2011 | Bowers et al. | |
| 8,117,233 B2 | 2/2012 | Liu et al. | |
| 8,229,775 B2 | 7/2012 | Adler et al. | |
| 8,260,768 B2 | 9/2012 | Wang et al. | |
| 8,429,179 B1 | 4/2013 | Mirhaji | |
| 8,868,562 B2* | 10/2014 | Crouch et al. | 707/739 |
| 2004/0220923 A1* | 11/2004 | Nica | G06F 17/30466 |
| 2007/0033279 A1 | 2/2007 | Battat et al. | |
| 2008/0040308 A1* | 2/2008 | Ranganathan | G06F 17/30595 |
| 2008/0256549 A1 | 10/2008 | Liu et al. | |
| 2010/0030723 A1 | 2/2010 | Au | |
| 2010/0250577 A1 | 9/2010 | Cao et al. | |
| 2012/0047124 A1 | 2/2012 | Duan et al. | |
| 2012/0246153 A1 | 9/2012 | Pehle | |
| 2013/0212085 A1* | 8/2013 | Nica et al. | 707/718 |
| 2013/0262361 A1* | 10/2013 | Arroyo | G06N 5/02 706/46 |
| 2014/0059043 A1* | 2/2014 | Sundara | G06F 17/30 707/723 |
| 2014/0143281 A1* | 5/2014 | Duan et al. | 707/798 |
| 2014/0156633 A1* | 6/2014 | Duan et al. | 707/713 |
| 2014/0214857 A1 | 7/2014 | Srinivasan et al. | |
| 2015/0019589 A1* | 1/2015 | Arroyo | G06F 17/30424 707/779 |

OTHER PUBLICATIONS

Abadi et al., "Scalable semantic web data management using vertical partitioning," in VLDB, 2007, pp. 411-422.

Bednarek et al., "Using Methods of Parallel Semi-structured Data Processing for Semantic Web", 2009 Third International Conference on Advances in Semantic Processing.

Chen et al., "Mapping XML to a Wide Sparse Table," in ICDE, 2012, pp. 630-641.

DBpedia dataset, "http://dbpedia.org.".

Duan et al., "Apples and oranges: a comparison of RDF benchmarks and real RDF datasets," in SIGMOD, 2011.

Guo et al., "LUBM: A benchmark for OWL knowledge base systems," Journal of Web Semantics, vol. 3, No. 2-3, pp. 158-182, 2005.

Hartig et al., "The SPARQL Query Graph Model for Query Optimization," 2007, pp. 564-578.

Huang et al., "Scalable SPARQL Querying of Large RDF Graphs," PVLDB, vol. 4, No. 11, pp. 1123-1134, 2011.

Kim et al., "From SPARQL to MapReduce. The Journey Using a Nested TripleGroup Algebra", Department of Computer Science, North Carolina State University, Raleigh, NC (2011).

Langegger et al. "A Semantic Web Middleware for Virtual Data Integration on the Web", The Semantic Web Research and Application (2008) 493-507.

Le et al., "Scalable Multi-Query Optimization for SPARQL", Data Engineering (ICDE), 2012 IEEE 28th International Conference on IEEE, 2012.

Letelier et al., "Static Analysis and Optimization of Semantic Web Queries", PODS 12, May 21-23, 2012, Scottsdale, Arizona USA.

Maduko et al., "Estimating the cardinality of rdf graph patterns," in WWW, 2007, pp. 1233-1234.

Matano et al., "A Path-based Relational RDF Database", Proceeding ADC '05 Proceedings of the 16th Astraliasian Database Conference—vol. 39 pp. 95-103 2005.

Morsey et al., "DBpedia SPARQL Benchmark—Performance Assessment with Real Queries on Real Data," in ISWC 2011, 2011.

Neumann et al., "The RDF-3X engine for scalable management of RDF data," The VLDB Journal, vol. 19, No. 1, pp. 91-113, Feb. 2010.

Quilitz and Leser, "Querying Distributed RDF Data Sources with SPARQL", 524-538, 2005.

Schmidt et al., "SP2Bench: A SPARQL Performance Benchmark," CoRR, vol. abs/0806.4627, 2008.

Son, et al., "Performance Evaluation of Storage—Independent Model for SPARQL-to-SQL Translation Algorithms", NTMS Feb. 2001.

SPARQL Query Language for RDF, http://www.w3.org/TR/rdf-sparql-query/.

Harris, S. "SPARQL, Query Processing with Conventional Relational Database Systems", 2005, 235-244.

Stocker et al., "SPARQL basic graph pattern optimization using selectivity estimation", in WWW 2008, pp. 595-604.

Tsialiamanis et al., "Heuristics-based query optimisation for SPARQL," in EDBT, 2012, pp. 324-335.

Udrea et al., "GRIN: A Graph-based RDF Index," in AAAI, 2007, pp. 1465-1470.

Virtuoso Open-Source Edition, "http://virtuoso.openlinksw.com/wiki/main/main/."

Weiss et al., "Hexastore: sextuple indexing for semantic web data management," PVLDB, vol. 1, No. 1, pp. 1008-1019, 2008.

Wilkinson et al., "Efficient RDF Storage and Retrieval in Jena2", in Semantic Web and Databases Workshop, 2003, pp. 131-150.

\* cited by examiner

```
SELECT...         ┌─ 702
FROM 1: │DPH│ AS T
                          ┌─ 704
WHERE 2: │T.ENTITY = ...│        706
                                    ─┐
  AND 3: │T.PREDn₁ = ... AND T.PREDn₂ = ...│
                                                  708
     4: │LEFT OUTER JOIN DS AS S0      ─┘
        │ON T.VALn₁ = S0.lid│
```

FIG. 7

SELECT ?s WHERE {?s SV$_1$ O$_1$(t$_1$). ?s SV$_2$ O$_2$(t$_2$)}       802

(a) SPARQL Query

SELECT T.ENTRY, D.ENTRY FROM RS AS R, DPH AS D
WHERE R.ENTRY='O$_2$' AND R.PROP='SV$_2$' AND D.ENTRY=T.ENTRY AND D.VAL0='O$_1$'
  AND D.PROP0='SV$_1$'
                              804
(b) Optimized SQL SELECT T.ENTRY, D.ENTRY FROM RS AS R, DPH AS D
WHERE R.ENTRY='O$_1$' AND R.PROP='SV$_1$' AND D.ENTRY=T.ENTRY AND D.VAL0='O$_2$'
  AND D.PROP0='SV$_2$'

(c) Alternative SQL
                              806

FIG. 8

METHOD AND APPARATUS FOR OPTIMIZING THE EVALUATION OF SEMANTIC WEB QUERIES

CROSS-REFERENCE TO RELATED APPLICATIONS

The present application is a continuation of co-pending U.S. patent application Ser. No. 13/856,428 filed Apr. 3, 2013. The entire disclosure of that application is incorporated herein by reference.

FIELD OF THE INVENTION

The present invention relates to semantic web queries.

BACKGROUND OF THE INVENTION

Resource Description Framework (RDF) is the de-facto standard for graph representation and the primary vehicle for data exchange over the Internet or World Wide Web. RDF is flexible and uses simple primitives for data representation, e.g., nodes and edges. In addition, RDF facilitates the integration of heterogeneous sources on the Web. The query language of choice for RDF is SPARQL. SPARQL queries are complex and contain a large number of triples and several layers of nesting. Optimization of SPARQL queries involves defining the order and methods with which to access the triples and building a hierarchical plan tree for query evaluation based on cost. A number of works have already studied how to efficiently evaluate semantic web (SPARQL) queries. Typical existing approaches are performing bottom-up SPARQL query optimization, i.e., individual triples or conjunctive patterns in the SPARQL query are independently optimized and then each optimizer attempts to piece together and order these individual plans into one global plan. These approaches are similar to typical relational database optimizers in that they rely on statistics to assign costs to query plans and are in contrast to less effective approaches whose SPARQL query optimization heuristics ignore statistics.

Simple SPARQL queries resemble Structured Query Language (SQL) conjunctive queries, and, therefore, one expects that existing techniques to be sufficient. However, a simple overview of real and benchmark SPARQL queries shows that SPARQL queries encountered in practice are far from simple. To a large extent due to the nature of RDF, these SPARQL queries are often arbitrarily complex, e.g., with deep nestings, and often, quite big, e.g. one exemplary SPARQL query involves a union of 100 queries. To make matters worse, typical operators in SPARQL often correspond to more exotic operators in the relational world that are less commonly considered by optimizers. For example, the common OPTIONAL operator in SPARQL corresponds to left-outer joins. All these observations lead to the conclusion that there is potential for novel optimization techniques in this space.

Although attempts have been made to provide query optimization both in SPARQL and beyond, important challenges remain for SPARQL query optimization translation of SPARQL queries to equivalent SQL queries over a relational database or store. Typical approaches perform bottom-up SPARQL query optimization, i.e., individual triples or conjunctive SPARQL patterns are independently optimized and then the optimizer orders and merges these individual plans into one global plan. These approaches are similar to typical relational optimizers in that they rely on statistics to assign costs to query plans. While these approaches are adequate for simple SPARQL queries, they are not as effective for more complicated, but still common, SPARQL queries. Such queries often have deep, nested sub-queries whose inter-relationships are lost when optimizations are limited by the scope of single triple or individual conjunctive patterns.

SUMMARY OF THE INVENTION

Exemplary embodiments of systems and methods in accordance with the present invention are directed to a hybrid two-step approach to query optimization. As a first step, a specialized structure, called a data flow is constructed that captures the inherent inter-relationships due to the sharing of common variables or constants of different query components. These inter-relationships often span the boundaries of simple conjuncts (or disjuncts) and are often across the different levels of nesting of a query, i.e., they are not visible to existing bottom-up optimizers. As a second step, the data flow and cost estimates are used to decide both the order with which to optimize the different query components and the plans that are going to be considered.

While the hybrid optimizer searches for optimal plans, this search is qualified by the fact that SPARQL queries are ultimately converted to SQL. That is, the plans are created such that when they are implemented in SQL they are amenable to optimizations by the relational query engine and can be efficiently evaluated in the underlying relational store. Therefore, SPARQL acts as a declarative query language that is optimized, while SQL becomes a procedural implementation language. This dependence on SQL essentially transforms the problem from a purely query optimization problem into a combined query optimization and translation problem. The translation part is particularly complex since there are many equivalent SQL queries that implement the same SPARQL query plan.

The hybrid optimization and the efficient SPARQL-to-SQL translation are generalizable and can be applied in any SPARQL query evaluation system. The hybrid optimizer can be used for SPARQL query optimization independent of the selected RDF storage, i.e., with or without a relational backend. The efficient translation of SPARQL to SQL can be generalized and used for any relational storage configuration of RDF. The combined effects of these two independent contributions drive the performance of the present invention.

BRIEF DESCRIPTION OF THE DRAWINGS

FIG. 7 is an illustration of an embodiment of a SQL code template;

FIG. 8 is an illustration of an embodiment of results from performing a translation without using an optimal method of translation;

DETAILED DESCRIPTION

Systems and methods in accordance with the present invention are directed to a hybrid SPARQL query optimization technique that is generic and independent of the choice of representing RDF data in relational schema or otherwise. Therefore, the query optimization techniques can be used by any other optimizer in this space. Optimizations that are representation-agnostic are separated from those that are representation-specific. This modularity provides significant advantages and the ability to fine-tune the storage and query optimization layers independently of each other.

Figures 1, 2:
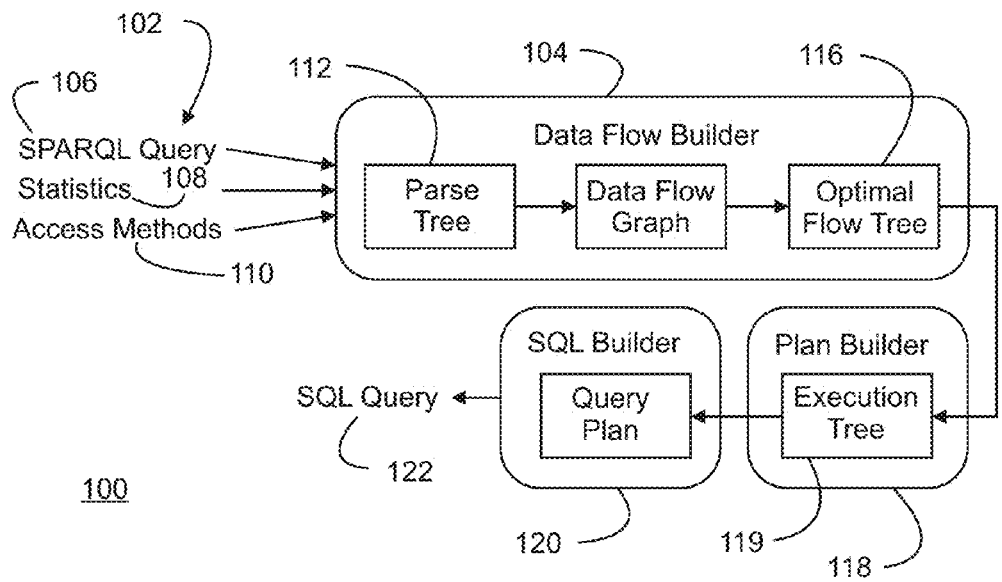
FIG. 1 is a schematic representation of an embodiment of a query optimization and translation architecture for use in accordance with the present invention.
FIG. 2 is an illustration of an embodiment of a sample input for query optimization.

Exemplary embodiments in accordance with the present invention achieve huge performance gains by independently optimizing SPARQL and the SPARQL to SQL. The hybrid SPARQL query optimization technique is generic and independent of how the RDF data are represented, e.g., relational schema, or otherwise. In fact these techniques can be applied directly to query optimization for native RDF stores. The query translation techniques are then tuned to our schema representation. Referring initially to FIG. 1, an exemplary embodiment of the steps of the optimization and translation process as well as the key structures constructed at each step 100 is illustrated. A plurality of inputs 102 are communicated to a data flow builder 104. These inputs include a semantic web query 106 such as a SPARQL query over an underlying data set, preferably an RDF dataset, statistics over the underlying dataset 108 and access methods for accessing the triple patterns in the query 110. The data flow builder contributes to query optimization by using the inputs to create a query parse tree 112. The data flow builder then uses the inputs to create a data flow graph 104 and to identify an optimal flow tree 116 through the data flow graph that minimizes costs while traversing all nodes in the data flow graph. The plan builder then creates an execution tree 118 from the optimal flow tree and a query plan 120 is created in the SQL builder. The query plan is translated into an SQL query 122 before it is used to execute the query.

Regarding the three inputs, the SPARQL query, Q, conforms to the SPARQL 1.0 standard. Therefore, each query Q is composed of a set of hierarchically nested graph patterns, $\mathcal{P}$, with each graph pattern P∈$\mathcal{P}$ being, in its most simple form, a set of triple patterns. The statistics S over the underlying RDF dataset are defined using types and precision with regard to specific implementations. Examples of collected statistics include, but are not limited to, the total number of triples, average number of triples per subject, average number of triples per object, and the top-k URIs or literals in terms of number of triples in which they appear. The access methods, $\mathcal{M}$, provide alternative ways to evaluate a triple pattern t for some pattern P∈$\mathcal{P}$. The methods are system-specific and dependent on existing indexes. For example, for a system having only subject and object indexes, i.e., no predicate indexes, the methods would be access-by-subject (acs), by access-by-object (aco) or a full scan (sc).

Referring to FIG. 2, a sample set of inputs 200 is illustrated. These inputs include a sample query Q 202 that retrieves the people that founded or are board members of companies in the software industry. For each such company, the query retrieves the products that were developed by that company, the company's revenue and, optionally, the number of employees in that company. The statistics S 204 contain the top-k values 206 for the constants in the query, e.g., IBM or industry and a count 208 for each constant value the indicates the frequency of occurrence of that constant value in the base triples of the query. The access methods 210 include a set 212 containing a plurality of methods for accessing the triple patterns in the query. As illustrated, three different access methods are included in $\mathcal{M}$, an access method that performs a data scan (sc), an access method that retrieves all the triples given a subject (acs) and an access method that retrieves all the triples given an object (aco).

As was shown in FIG. 1, the optimizer includes two modules, the Data Flow Builder (DFB) 104 and the Query Plan Builder (QPB) 119, Regarding the DFB, triple patterns in the query typically share variables, and the evaluation of a first query is often dependent on the evaluation of a second query. Returning to FIG. 2, for example, triple pattern $t_1$ 214 shares variable ? x 216 with both triple patterns $t_2$ 218 and $t_3$ 220. In the DFB, sideways information passing is used to construct an optimal flow tree that considers cheaper patterns, i.e., in terms of estimated variable bindings, first before feeding these bindings to more expensive patterns. While the DFB considers information passing irrespectively of the query structure, i.e., the nesting of patterns and pattern operators, the QPB module incorporates this structure to build an execution tree, that is a storage-independent query plan. The query translation uses this execution tree to produce a storage specific query plan.

Figure 3:
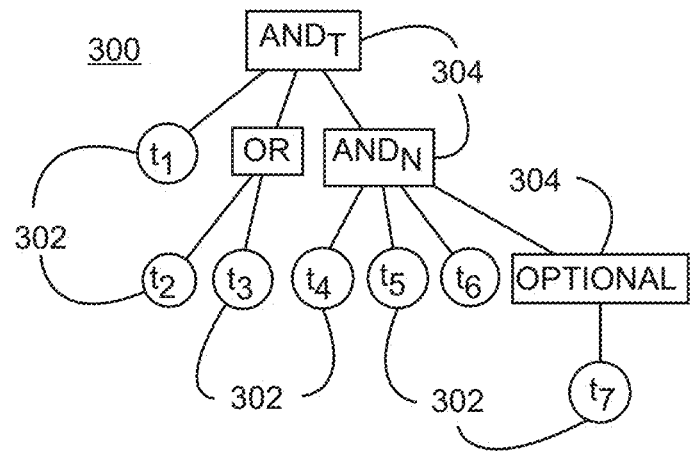
FIG. 3 is an illustration of an embodiment of query parse tree.

The DFB starts by building a parse tree for the input query. Referring to FIG. 3, an embodiment of a parse tree built for the query in FIG. 2 is illustrated. The parse tree includes a plurality of nodes 302 for the triples in the query and a plurality of nodes 304 for the relationships among the triples. Sideways information passing is used with the parse tree to compute the data flow graph 400 illustrated in FIG. 4. The data flow graph takes into account both a given triple and an access pattern used to access this triple and represents the dependences among the executions of each triple pattern. Each node 402 in the data flow graph is a pair containing a given triple pattern 404 from the query and a given access method 406 from the input set of access methods. An edge 409 between any two given nodes denotes one triple producing a shared variable that another triple requires. Starting at any given node containing a given triple and access method, edges are determined from the parse tree. Combinations of nodes and edges define a plurality of routes or paths through the data flow graph that contain given sets of nodes and edges. Exemplary embodiments of systems and methods in accordance with the present invention look for an optimal path through the parse tree that minimizes cost and that includes all of triples from the original query. Therefore, the DFB computes the optimal flow tree through the data flow graph that includes a subset of nodes 408. The optimal flow tree determines an optimal way in terms of minimizing costs to traverse all the triple patterns in the query.

In one embodiment, cost is determined based on a triple method cost (TMC). The triple method cost is a function that maps TMC(t,m,S):→c; c∈$\mathbb{R}_{\leq 0}$, where t is a given triple, m is an access method, S are the statistics for RDF. A cost c is assigned to evaluating t using m with respect to statistics S. The mapping function varies with the degree to which S are defined. Therefore, the cost estimation depends on the statistics S. In the example query of FIG. 2, TMC($t_4$,aco,S)=2, because the exact lookup cost using the object of triple $t_4$, Software, is known. For a scan method, TMC($t_4$,sc,S)=26, i.e., the total number of triples in the dataset. Finally, TMC($t_4$,acs,S)=5, i.e., the average number of triples per subject, assuming subject is bound by a prior triple access.

Regarding the building of the data flow graph, the data flow graph models how using the current set of bindings for variables can be used to access other triples. In modeling this flow, the semantics of AND, OR and OPTIONAL patterns are respected. A set of helper functions are used to define the graph. The symbol ↑ refers to parents in the query tree structure. For a triple or a pattern, this is the immediately enclosing pattern. The symbol * denotes transitive closure. The first helper function is produced variable. The data flow graph models how using the current set of bindings for variables can be used to access other triples. In modeling this flow, the semantics of AND, OR and OPTIONAL patterns are respected. First, a set of helper functions are introduced and are used to define the graph. Produced Variables is a function, $\mathcal{P}(t,m): \to V_{prod}$, that maps a triple and an access method pair to a set of variables that are bound after the lookup, where t is a triple, m is an access method, and $V_{prod}$ is the set of variables in the triple produced by the lookup. In the example query, for the pair $(t_4,aco)$, $P(t_4,aco): \to y$, because the lookup uses Software as an object, and the only variable that gets bound as a result of the lookup is y.

Required Variables is a function, $\mathbb{R}(t,m): \to V_{req}$, that maps a triple and an access method pair to a set of variables that are required t be bound for the lookup, where t is a triple, m is an access method, and $V_{req}$ is the set of variables required for the lookup. In the example query, $\mathbb{R}(t_5,aco): \to y$. That is, if the aco access method is used to evaluate $t_5$, then variable y is required to be bound by some prior triple lookup.

Least Common Ancestor, LCA(p,p') is the first common ancestor of patterns p and p'. More formally, it is defined as follows: $LCA(p,p')=x \Leftrightarrow x \in \uparrow^*(p) \wedge x \in \uparrow^*(p') \wedge \not\exists y.y \in \uparrow^*(p) \wedge y \in \uparrow^*(p') \wedge x \in \uparrow^*(y)$. As an example, in FIG. 3, the least common ancestor of $AND_N$ and OR is $AND_T$. The Ancestors to LCA function, ↑↑(p,p') refers to the set of ↑* built from traversing from p to the LCA(p,p'):

$$\uparrow\uparrow(p,p') = \{x | x \in \uparrow^*(p) \wedge \neg x \in \uparrow^*(LCA(p,p'))\}$$

For instance, for the query shown in FIG. 3, $\uparrow\uparrow(t_1,LCA(t_1,t_2))=\{AND_T,OR\}$.

For OR connected patterns, ∪ denotes that two triples are related in an OR pattern, i.e., their least common ancestor is an OR pattern: ∪(t,t')≡LCA(t,t') is OR. In the example, $t_2$ and $t_3$ are ∪. For OPTIONAL connected patterns, ∩̂ denotes if one triple is optional with respect to another, i.e., there is an OPTIONAL pattern guarding t' with respect to t:

$$\hat{\cap}(t,t') \equiv \exists p:p \in \uparrow\uparrow(t',t) \wedge p \text{ is OPTIONAL}$$

In the example, $t_6$ and $t_7$ are ∩̂ because $t_7$ is guarded by an OPTIONAL in relation to $t_6$.

The data flow graph is a graph of G=<V,E>, where V=($\mathcal{T} \times \mathcal{M}$)∪root, where root is a special node added to the graph. A directed edge (t,m)→(t',m') exists in V when the following conditions hold: $\mathcal{P}(t,m) | \wedge (t',m') \neg \mathbb{R} (\cup(t,t') \vee \hat{\cap}(t',t))$. In addition, a directed edge from root exists to a node (t,m) if $\mathbb{R}(t,m)=\phi$.

In the example, a directed edge root→$(t_4,aco)$ exists in the data flow graph (in FIG. 4 the whole graph is shown and for simplicity in the figure the root node is omitted), because $t_4$ can be accessed by an object with a constant. In addition, it has no required variables. Further, $(t_4,aco) \to (t_2,aco)$ is part of the data flow graph, because $(t_2,aco)$ has a required variable y that is produced by $(t_4,aco)$. In turn, $(t_2,aco)$ has an edge to $(t_1,acs)$, because $(t_1,acs)$ has a required variable x which is produced by $(t_2,aco)$.

The data flow graph $\mathcal{G}$ is weighted, and the weights for each edge between two nodes is determined by a function: $W((t,m),(t',m')),S) \to w$. The w is derived from the costs of the two nodes, i.e., TMC(t,m,S), and TMC(t',m',S). A simple implementation of this function, for example, could apply the cost of the target node to the edge. In the example, for instance, w for the edge root→$(t_4,aco)$ is 2, whereas the edge root→$(t_4,asc)$ is 5.

Given a weighted data flow graph $\mathcal{G}$, the optimal, in terms of minimizing the cost, order for accessing all the triples in query Q is the minimal weighted tree that covers all the triples in Q, which is NP-hard. Since the query can contain a large number of triples, a greedy algorithm to is used to determine the execution tree. If T denotes the execution tree that is being computed and τ refers to the set of triples corresponding to nodes already in the tree, $\tau \equiv \{t_i | \exists m_i(t_i,m_i \in \mathcal{T} \}$. The object is to add a node that adds a new triple to the tree while adding the cheapest possible edge. Formally, a node (t',m') is chosen such that:

$(t',m') \in V \wedge$ #node to add $t' \notin \tau \wedge$ #node adds new triple $\exists (t,m):$ $$\begin{pmatrix} (t,m) \in \mathcal{T} \wedge \#node \text{ to add} \\ (t,m) \to (t',m') \wedge \#valid \text{ edge to new node} \\ \#no \text{ similar node such that ...} \\ \not\exists (t''m,m''), (t''',m'''): \\ \begin{pmatrix} (t'',m'') \in \mathcal{T} \wedge \\ t''' \notin \tau \wedge \\ (t'',m'') \to (t''',m''') \wedge \\ \#... \text{ adding}(t''',m''') \text{ is cheaper} \\ W((t'',m''),(t''',m''')) < W((t,m),(t',m')) \end{pmatrix} \end{pmatrix}$$

Figure 4:
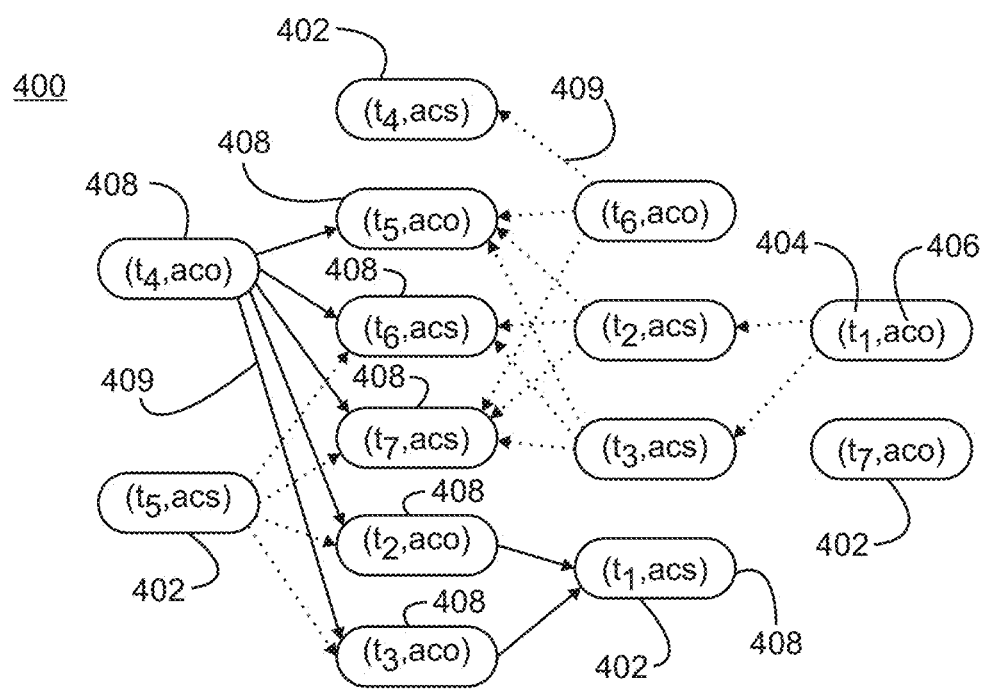
FIG. 4 is an illustration of an embodiment of a data flow graph.

On the first iteration, $\mathcal{T}_0$=root, and $\tau_0$=φ. $\mathcal{T}_{i+1}$ computed by applying the step defined above, and the triple of the chosen node is added to $\tau_{i+1}$. In the example, root→$(t_4,aco)$ is the cheapest edge, so $\mathcal{T}_1=(t_4,aco)$, and $\tau_0=t_4$. Then $(t_2,aco)$ is added to $\mathcal{T}_2$, and so on. The iterations stop at $\mathcal{T}_n$, where n is the number of triples in Q. FIG. 4 shows the computed tree, as indicated by nodes 408, and the algorithm below computes the optimal slow tree, where function triple(j) returns the triple associated with a node in $\mathcal{G}$.

```
  Input: The weighted data flow graph G
  Output: An optimal flow tree T
1   τ ← ∅;
2   J ← root;
3   E ← SortEdgesByCost(G);
4   while |J| < |Q| do
5     for each edge e_ij ∈ E do
6       if i ∈ J ∧ j ∉ J ∧ triple(j) ∉ τ then
7         J ← J ∪ j;
8         τ ← τ ∪ triple(j);
9         T ← e_ij;
```

Both the data flow graph and the optimal flow tree largely ignore the query structure, i.e., the organization of triples into patterns, and the operators between the (triple) patterns. Yet, they provide useful information as to how to construct an actual plan for the input query, the focus of this section and output of the QPB module.

In more detail, the main algorithm ExecTree of the module appears below. The algorithm is recursive and takes as input the optimal flow tree F computed by DFB, and (the parse tree of) a pattern P, which initially is the main pattern that includes the whole query.

```
    Input: The optimal flow tree F of query Q, a pattern P in Q
    Output: An execution tree T for P, a set L of execution sub - trees
1   T ← ∅; L ← ∅;
2   switch the type of pattern P do
3     case P is a SIMPLE pattern
4       for each triple pattern t_i ∈ P do
5         T_i ← GetTree(t_i,F); L_i ← ∅;
6         if isLeaf(T_i,F) then L ← L ∪ T_i;
7         else (T,L) ← AndTree(F,T,L,T_i,L_i);
8     case P is an AND pattern
9       for each sub-pattern P_i ∈ P do
10        (T_i,L_i) ← ExecTree(F,P_i);
11        (T,L) ← AndTree(F,T,L,T_i,L_i);
12    case P is an OR pattern
13      for each sub-pattern P_i ∈ P do
14        (T_i,L_i) ← ExecTree(F,P_i);
15        ← OrTree(F,T,L,T_i,L_i)
16    case P is an OPTIONAL pattern
17      (T',L') ← ExecTree(F,P);
18      (T,L) ← OptTree(F,T,L,T_i,L_i)
19    case P is a nested pattern
20      (T,L) ← ExecTree(F,P);
21  return (T,L)
```

In the running example, for the query 202 in FIG. 2, the algorithm takes as input the parse tree in FIG. 3 and the optimal flow tree in FIG. 4. The algorithm returns a schema-independent plan T, called the execution tree for the input query pattern P. The set of returned execution sub-trees $\mathcal{L}$ is guaranteed to be empty when the recursion terminates, but contains important information that the algorithm passes from one level of recursion to the previous one(s) while the algorithm runs.

There are four main types of patterns in SPARQL, namely, SIMPLE, AND, UNION (a.k.a OR), and OPTIONAL patterns, and the algorithm handles each one independently as illustrated through the running example. Initially, both the execution tree T and the set $\mathcal{L}$ are empty (line 1). Since the top-level node in FIG. 3 is an AND node, the algorithm considers each sub-pattern of the top-level node and calls itself recursively (lines 8-10) with each of the subpatterns as argument. The first sub-pattern recursively considered is a SIMPLE one consisting of the single triple pattern $t_1$. By consulting the flow tree F, the algorithm determines the optimal execution tree for $t_1$ which consists of just the node $(t_1,acs)$ (line 5). By further consulting the flow (line 6) the algorithm determines that node $(t_1,acs)$ is a leaf node in the optimal flow and therefore it's evaluation depends on the evaluation of other flow nodes. Therefore, the algorithm adds tree $(t_1,acs)$ to the local late fusing set $\mathcal{L}$ of execution trees. Set $\mathcal{L}$ contains execution sub-trees that should not be merged yet with the execution tree T but should be considered later in the process. Intuitively, late fusing plays two main roles. It uses the flow as a guide to identify the proper point in time to fuse the execution tree T with execution sub-trees that are already computed by the recursion, and it aims to optimize query evaluation by minimizing the size of intermediate results computed by the execution tree. Therefore, it only fuses sub-trees at the latest possible place, when either the corresponding sub-tree variables are needed by the later stages of the evaluation, or when the operators and structure of the query enforce the fuse.

The first recursion terminates by returning $(T_1,\mathcal{L}_1)=(\phi, \{L_1=(t_1,acs)\})$. The second sub-pattern in FIG. 3 is an OR and is therefore handled in lines 12-15. The resulting execution sub-tree contains three nodes, an OR node as root (from line 15) and nodes $(t_2,aco)$ and $(t_3,aco)$ as leaves (recursion in line 14). This sub-tree is also added to local set $\mathcal{L}$ and the second recursion terminates by returning $(T_2,\mathcal{L}_2)=(\phi,\{L_2=\{OR,(t_2,aco),(t_3,aco)\}\})$. Finally, the last sub-pattern in FIG. 3 is an AND pattern again, which causes further recursive calls in lines 8-11. In the recursive call that processes triple $t_4$ (lines 5-7), the execution tree node $(t_4,aco)$ is the root node in the flow and therefore it is merged to the main execution tree T. Since T is empty, it becomes the root of the tree T. The three sub-trees that include nodes $(t_5,aco),(t_6,acs)$, and OPT={(OPTIONAL),$(t_7,aco)$} are all becoming part of set $\mathcal{L}$. Therefore, the third recursion terminates by returning $(T_3,\mathcal{L}_3)=(t_4, aco),\{\mathcal{L}_3=\{(t_5,aco)\},\mathcal{L}_4=\{(t_6,aco)t_5,aco\},\mathcal{L}_5=\{$ (OPTIONAL),$(t_7,aco)\}\}$. After each recursion ends (line 10), the algorithm considers (line 11) the returned execution $T_i$ and late-fuse $\mathcal{L}_i$ trees and uses function AndTree to build a new local execution T and set $\mathcal{L}$ of late-fusing trees (by also consulting the flow and following the late-fusing guidelines on postponing tree fusion unless it is necessary for the algorithm to progress). So, after the end of the first recursion and the first call to function AndTree, $(T,\mathcal{L})=(T_1,\mathcal{L}_1)$, i.e., the trees returned from the first recursion. After the end of the second recursion, and the second call to AndTree, $(T,\mathcal{L})=(\phi, \mathcal{L}_1 \cup \mathcal{L}_2)$. Finally, after the end of the third recursion, $(T, \mathcal{L})=((t_4,aco),\mathcal{L}_1 \cup \mathcal{L}_2 \cup \mathcal{L}_3)$.

Figure 5:
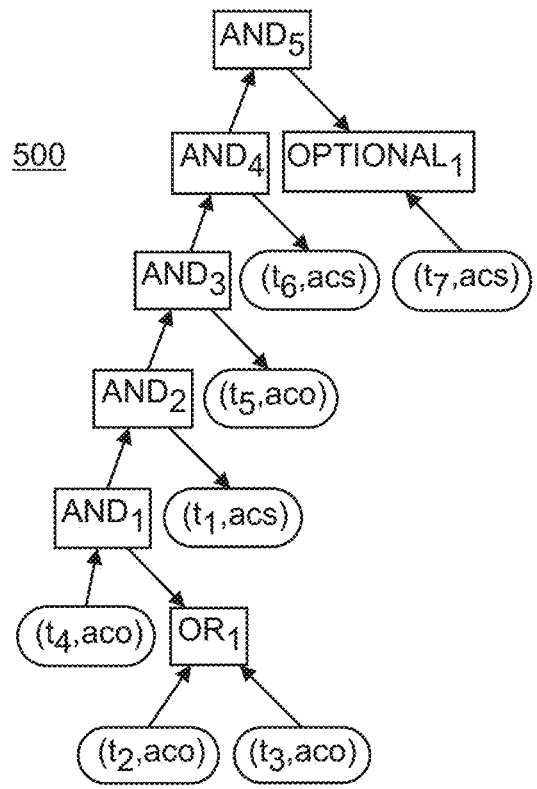
FIG. 5 is an illustration of an embodiment of an execution tree.

The last call to AndTree builds the tree 500 illustrated in of FIG. 5 as follows. Starting from node $(t_4,aco)$, it consults the flow and picks from the set $\mathcal{L}$ the sub-tree $L_2$ and connects this to node $(t_4,aco)$ by adding a new AND node as the root of the tree. Sub-trees $L_3$, $L_4$ and $L_5$ can be added at this stage to T but they are not considered as they violate the principles of late-fusing (their respective variables are not used by any other triple, as is also obvious by the optimal flow). On the other hand, there is still a dependency between the latest tree T and $L_1$ since the selectivity of $t_1$ can be used to reduce the intermediate size of the query results (especially the bindings to variable ? y). Therefore, a new AND is introduced and the existing T is extended with $L_1$. The process iterates in this fashion until the whole tree in FIG. 5 is generated.

Using the optimal flow tree as a guide enabled weaving the evaluation of different patterns, while the structured based processing guarantees that the associativity of operations in the query is respected. So, the optimizer can generate plans like the one in FIG. 5 where only a portion of a pattern is initially evaluated, e.g., node $(t_4,aco)$, while the evaluation of other constructs in the pattern, e.g., node $(t_5,aco)$, can be postponed until it no longer can be avoided. At the same time, this de-coupling from query structure facilitates pushing the evaluation of patterns early in the plan, e.g., node $(t_1,acs)$, when doing so improves selectivity and reduces the size of intermediate results.

The SPARQL to SQL translator takes as input the execution tree generated from the QPB module and performs two operations. First, it transforms the execution tree into an equivalent query plan that exploits the entity-oriented storage of, for example, R2DF. Second, it uses the query plan to create the SQL query which is executed by the database.

In order to build the query plan, the execution tree provides an access method and an execution order for each triple but assumes that each triple node is evaluated independently of the other nodes. However, one of the advantages of the entity-oriented storage is that a single access to, say, the DPH relation might retrieve a row that can be used to evaluate multiple triple patterns (star-queries). To this end, starting from the execution tree the translator builds a query plan where triples with the same subject (or the same object) are merged in the same plan node. A merged plan node indicates to the SQL builder that the containing triples form a star-query and is executed with a single SQL select. Merging of nodes is always advantageous with one exception, when the star query involves entities with spills. The presence of such entities would require self-joins of the DPH (RPH) relations in the resulting SQL statement. Self-joins are expensive, and therefore the following strategy is used to avoid them. When the star-queries involve entities with spills, the evaluation of the star-query is cascaded by issuing multiple SQL statements, each evaluating a subset of the star-query while at the same time filtering entities from the subsets of the star-query that have been previously evaluated. The multiple SQL statements are such that no SQL statement accesses predicates stored into different spill rows. Of course, the question remains on how to determine whether spills affect a star query. In accordance with exemplary embodiment of the methods and systems of the present invention, this is straightforward. With only a tiny fraction of predicates involved in spills, e.g., due to coloring, the optimizer consults an in-memory structure of predicates involved in spills to determine during merging whether any of the star-query predicates participate in spills.

During the merging process, both the structural and semantic constraints are respected. The structural constraints are imposed by the entity-oriented representation of data. To satisfy the structural constraints, candidate nodes for merging need to refer to the same entity, have the same access method and do not involve spills. As an example, in FIG. 4 nodes $t_2$ and $t_3$ refer to the same entity due to variable ? x and the same access method aco, as do nodes $t_6$ and $t_7$, due to the variable ? y and the method acs.

Semantic constraints for merging are imposed by the control structure of the SPARQL query, i.e., the AND, UNION, OPTIONAL patterns. This restricts the merging of triples to constructs for which we can provide the equivalent SQL statements to access the relational tables. Triples in conjunctive and disjunctive patterns can be safely merged because the equivalent SQL semantics are well understood. Therefore, with a single access, the system, can check whether the row includes the non-optional predicates in the conjunction. Similarly, it is possible to check the existence of any of the predicates mentioned in the disjunction. More formally, to satisfy the semantic constraints of SPARQL, candidate nodes for merging need to be ANDMergeable, ORMergeable or OPTMergeable.

For AND Merge able nodes, two nodes are ANDMergeable if f their least common ancestor and all intermediate ancestors are AND nodes: ANDMergeable(t,t') $\Leftrightarrow$ $\forall$x:x$\in$($\uparrow\uparrow$(t,LCA(t,t'))$\cup\uparrow\uparrow$(t',LCA(t,t')))$\Rightarrow$ x is AND. For OR Merge able nodes, two nodes are ORMergeable if f their least common ancestor and all intermediate ancestors are OR nodes: ORMergeable (t,t') $\Leftrightarrow$ $\forall$x:x$\in$($\uparrow\uparrow$(t,LCA(t,t'))$\cup\uparrow\uparrow$(t',LCA(t,t')))$\Rightarrow$ x is OR. Going back to the execution tree in FIG. 5, notice that ORMergeable $(t_2,t_3)$ is true, but ORMergeable $(t_2,t_5)$ is false. For OPTIONAL Merge able nodes, two nodes are OPTMergeable if f their least common ancestor and all intermediate ancestors are AND nodes, except the parent of the higher order triple in the execution plan which is OPTIONAL: OPTMergeable(t,t') $\Leftrightarrow$ $\forall$x:x$\in$($\uparrow\uparrow$(t,LCA(t,t'))$\cup\uparrow\uparrow$(t',LCA(t,t'))) $\Rightarrow$ x is AND$\vee$ {x is OPTIONAL $\wedge$ x is parent of t'}. As an example, in FIG. 5 OPTMergeable $(t_6,t_7)$ is true.

Figure 6:
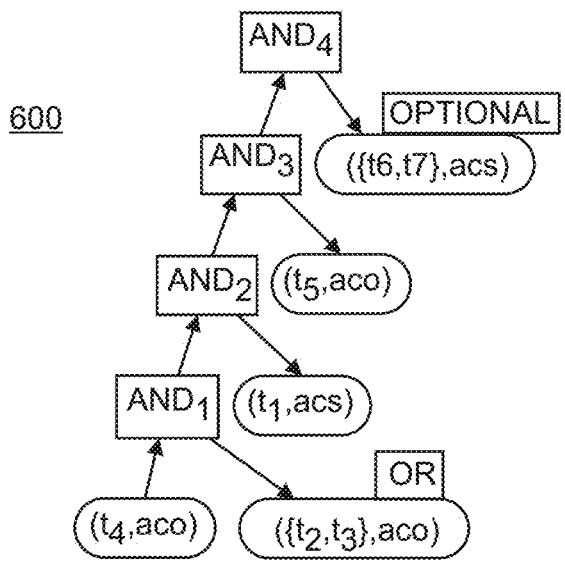
FIG. 6 is an illustration of an embodiment of a query plan tree.

Given the input execution tree, pairs of nodes are identified that satisfy both the structural and semantic constraints introduced and are merged. So, given as input the execution tree in FIG. 5, the resulting query plan tree 600 is shown in FIG. 6. Notice that in the resulting query plan there are two node merges, one due to the application of the ORMergeable definition, and one by the application of the OPTMergeable definition. Each merged node is annotated with the corresponding semantics under which the merge was applied. As a counter-example, consider node $(t_5,aco)$ which is compatible structurally with the new node $(\{t_2,t_3\}, aco)$ since they both refer to the same entity through variable ? y, and have the same access method aco. However, these two nodes are not merged since they violate the semantic constraints, i.e., they do not satisfy the definitions above since their merge would mix a conjunctive with a disjunctive pattern. Even for the simple running example, the two identified node merges result in significant savings in terms of query evaluation. Intuitively, one can think of these two merges as eliminating two extra join operations during the translation of the query plan to an actual SQL query over the database schema.

SQL generation is the final step of query translation. The query plan tree plays an important role in this process, and each node in the query plan tree, be it a triple, merge or control node, contains the necessary information to guide the SQL generation. For the generation, the SQL builder performs a post order traversal of the query plan tree and produces the equivalent SQL query for each node. The whole process is assisted by the use of SQL code templates.

In more detail, the base case of SQL translation considers a node that corresponds to a single triple or a merge. FIG. 7 shows the template used to generate SQL code for such a node. The code in box 1 702 sets the target of the query to the DPH or RPH tables, according to the access method in the triple node. The code in box 2 704 restricts the entities being queried. As an example, when the subject is a constant and the access method is acs, the entry is connected to the constant subject values. When the subject is variable and the method is acs, then entry is connected with a previously-bound variable from a prior SELECT sub-query. The same reasoning applies for the entry component for an object when the access method is aco. Box 3 706 illustrates how one or more predicates are selected. That is, when the plan node corresponds to a merge, multiple $pred_i$ components are connected through conjunctive or disjunctive SQL operators. Finally, box 4 708 shows how to do outer join with the secondary table for multi-valued predicates.

The operator nodes in the query plan are used to guide the connection of instantiated templates like the one in FIG. 7. It has already been shown how AND nodes are implemented through the variable binding across triples as in box 2. For OR nodes we use the SQL UNION operator to connect its components' previously defined SELECT statements. For OPTIONAL, LEFT OUTER JOIN is used between the SQL template for the main pattern and the SQL template for the OPTIONAL pattern. The final SQL for the running example where the SQL templates described above are instantiated according to the query plan tree in FIG. 6 and the SPARQL query of FIG. 2 appears below.

WITH QT$_4$RPH AS
  SELECT T.val$_1$ASval$_1$FROM RPH AS T WHERE T.entry='Software'AND T.pred$_1$='industry'.
QT$_4$DS AS
  SELECT COALESCE (S.elm,T.val$_1$) AS y
  FROM QT$_4$4RPH AS T LEFT OUTER JOIN DS AS S ON T.val$_1$=S.l_id
QT$_{23}$RPH AS
  SELECT QT$_4$DS.y,
    CASE T.pred$_m$='founder' THEN val$_m$ ELSE null END AS val$_m$,
    CASE T.pred$_o$='member' THEN val$_o$ ELSE null END AS val$_o$
  FROM RPH AS T, QT$_4$DS
  WHERE T.entry=QT$_4$DS.y AND (T.pred$_m$='founder' OR T.pred$_o$='member'),
QT$_{23}$ AS
  SELECT LT.val$_o$ AS x,T.y FROM QT$_{23}$RPH as T,TABLE (T.val$_m$,T.val$_o$) as LT(val$_o$)

WHERE LT.val$_0$ IS NOT NULL
QT$_1$DPH AS
    SELECT T.entry AS x,QT$_{23}$.y FROM DPH AS T,QT$_{23}$
        WHERE T.entry=QT$_{23}$.x AND T.pred$_k$='home' AND T.val$_1$='Palo Alto',
QT$_5$RPH AS
    SELECT T.entry AS y,QT$_1$DPH.x FROM RPH AS T,QT$_1$DPH
        WHERE T.entry=QT$_1$DPH.y AND T.pred$_1$='developer',
QT$_{67}$DPH AS
    SELECT T.entry AS y,QT$_5$RPH.x,CASE T.pred$_k$='employees' THEN val$_k$ ELSE null END as z
    FROM DPH AS T,QT$_5$RPH WHERE T.entry=QT$_5$RPH.y AND T.pred$_m$='revenue'
SELECT x,y,z FROM QT$_{67}$DPH As illustrated above, several Common Table Expressions (CTEs) are used for each plan node. For example, t$_4$ is evaluated first and accesses RPH using the Software constant. Since industry is a multivalued predicate, the RS table is also accessed. The remaining predicates in this example are single valued and the access to the secondary table is avoided. The ORMergeable node t$_{23}$ is evaluated next using the RPH table where the object is bound to the values of y produced by the first triple. The WHERE clause enforces the semantic that at least one of the predicates is present. The CTE projects the values corresponding to the present predicates and null values for those that are missing. The next CTE just flips these values, creating a new result record for each present predicate. The plan continues with triple t$_5$ and is completed with node the OPTMergeable node t$_{67}$. Here no constraint is imposed for the optional predicate making its presence optional on the record. In case the predicate is present, the corresponding value is projected, otherwise null. In this example, each predicate is assigned to a single column. When predicates are assigned to multiple columns, the position of the value is determined with CASE statements as seen in the SQL sample.

To examine the effectiveness of the query optimization, experiments were conducted using both a 1 M triple microbenchmark and queries from other datasets. As an example, for the microbenchmark, two constant values O$_1$ and O$_2$ were considered with relative frequency in the data of 0.75 and 0.01, respectively. Then, the simple query 802 shown in FIG. 8 was used that allowed data flows in either direction, i.e., evaluation could start on t$_1$ with an aco using O$_1$, then the bindings for ? s to were used access t$_2$ with an acs, or start instead on t$_2$ with an aco using O$_2$ and use bindings for ? s to access t$_1$. The latter case is better.

In FIG. 8, the SQL generated by our SPARQL optimizer 804 is shown, while an equivalent SQL query corresponding to the only alternative but sub-optimal flow 806 is also shown. The former query took 13 ms to evaluate, whereas the latter took 5 times longer, i.e., 65 ms, suggesting that the optimization is in fact effective even in this simple query. Using real and benchmark queries from datasets resulted in even more striking differences in evaluation times. For example, when optimized by our SPARQL optimizer query, PQ1 from PRBench (Section 4) was evaluated in 4 ms, while the translated SQL corresponding to a sub-optimal flow required 22.66 seconds.

The performance of an R2DF schema, using IBM DB2 as the relational back-end, was compared to that of Virtuoso 6.1.5 OpenSource Edition, Apache Jena 2.7.3 (TDB), OpenRDF Sesame 2.6.8, and RDF-3X 0.3.5. R2DF, Virtuoso and RDF-3X were run in a client server mode on the same machine and all other systems were run in process mode. For both Jena and Virtuoso, all recommended optimizations were enabled. Jena had the BGP optimizer enabled. For Virtuoso all recommended indexes were built. For R2DF, only indexes on the entry columns of the DPH and RPH relations were added, (no indexes on the pred$_i$ and val$_i$ columns).

Experiments were conducted with 4 different benchmarks, LUBM, SP2Bench, DBpedia, and a private benchmark PRBench. The LUBM and SP2Bench benchmarks were scaled up to 100 million triples each, and their associated published query workloads were used. The DBpedia 3.7 benchmark has 333 million triples. The private benchmark included data from a tool integration application, and it contained 60 million triples about various software artifacts generated by different tools, e.g., bug reports, requirements, etc. For all systems, queries were evaluated in a warm cache scenario. For each dataset, benchmark queries were randomly mixed to create a run, and each run was issued 8 times to the 5 stores. The first run was discard, and the average result for each query over 7 consecutive runs was reported. For each query, its running time was measured excluding the time taken to stream back the results to the API, in order to minimize variations caused by the various APIs available. As shown in Table 1, the evaluated queries were classified into four categories. Queries that failed to parse SPARQL correctly were reported as unsupported. The remainder supported queries were further classified as either complete, timeout, or error. The results from each system were counted, and when a system provided the correct number of answers, the query was classified as completed. If the system returned the wrong number of results, this was classified as an error. Finally, a timeout of 10 minutes was used to trap queries that do not terminate within a reasonable amount of time. In the table, the average time taken (in seconds) to evaluate complete and timeout queries is reported. For queries that timeout, their running time was set to 10 minutes. The time of queries that return the wrong number of results is not reported.

This is the most comprehensive evaluation of RDF systems. Unlike previous works, this is the first study that evaluates 5 systems using a total of 78 queries, over a total of 600 million triples. The experiments were conducted on 5 identical virtual machines (one per system), each equivalent to a 4-core, 2.6 GHz Intel Xeon system with 32 GB of memory running 64-bit Linux. Each system was not memory limited, meaning it could consume all of its 32 G. None of the systems came close to this memory limit in any experiment.

TABLE 1

Summary Results for All Systems and Datasets

| Dataset | System | Supported | | | Unsupported | Mean (secs) |
| --- | --- | --- | --- | --- | --- | --- |
| | | Complete | Timeout | Error | | |
| LUBM | Jena | 12 | — | — | — | 35.1 |
| (100M | Sesame | 4 | — | 8 | — | 164.7 |
| triples) | Virtuoso | 12 | — | — | — | 16.8 |
| (12 queries) | RDF-3X | 11 | — | — | 1 | 2.8 |
| | R2DF | 12 | — | — | — | 8.3 |
| SP2Bench | Jena | 11 | 6 | — | — | 253 |
| (100M | Sesame | 8 | 8 | 1 | — | 330 |
| triples) | Virtuoso | 16 | 1 | — | — | 211 |
| (17 queries) | RDF-3X | 6 | 2 | 2 | 7 | 152 |
| | R2DF | 16 | 1 | — | — | 108 |
| DBpedia | Jena | 18 | 1 | 1 | — | 33 |
| (333M | Virtuoso | 20 | — | — | — | 0.25 |
| triples) | R2DF | 20 | — | — | — | 0.25 |
| (20 queries) | | | | | | |
| PRBench | Jena | 29 | — | — | — | 5.7 |
| (60M triples) | Virtuoso | 25 | — | — | 4 | 3.9 |
| (29 queries) | R2DF | 29 | — | — | — | 1.0 |

The LUBM benchmark requires OWL DL inference, which is not supported across all tested systems. Without inference, most benchmark queries return empty result sets. To address this issue, the existing queries were expanded, and a set of equivalent queries that implement inference and do not require this feature from the evaluated system was created. As an example, if the LUBM ontology stated that GraduateStudent ⊑ Student, and the query asks for ? x rdf:type Student, the query was expanded into ? x rdf:type Student UNION ? x rdf:type Graduate Student. This set of expansions was performed, and the same expanded query was issued to all systems. From the 14 original queries in the benchmark, only 12 (denoted as LQ1 to LQ10, LQ13 and LQ14) are included here because 2 queries involved ontological axioms that cannot be expanded.

SP2Bench is an extract of DBLP data with corresponding SPARQL queries (denoted as SQ1 to SQ17). This benchmark was used as is, with no modifications. Prior reports on this benchmark were conducted with at most 5 million triples. It was scaled to 100 million triples, and some queries (by design) had rather large result sets. SQ4 in particular created a cross product of the entire dataset, which meant that all systems timeout on this query.

The DBpedia SPARQL benchmark is a set of query templates derived from actual query logs against the public DBpedia SPARQL endpoint. These were used templates with the DBpedia 3.7 dataset, and 20 queries (denoted as DQ1 to DQ20) were obtained that had non-empty result sets. Since templates were derived for an earlier DBpedia version, not all result in non-empty queries.

The private benchmark reflects data from a tool integration scenario where specific information about the same software artifacts are generated by different tools, and RDF data provides an integrated view on these artifacts across tools. This is a quad dataset where triples are organized into over 1 million 'graphs'. This caused problems for some systems which do not support quads, e.g., RDF-3X, Sesame. Twenty nine SPARQL queries (denoted as PQ1 to PQ29) were used, with some being fairly complex queries, e.g., a SPARQL union of 100 conjunctive queries.

Table 1 shows that R2DF is the only system that evaluates correctly and efficiently 77 out of the 78 tested queries. As mentioned, SQ4 was the only query in which the system did timeout as did all the other systems. If SQ4 is excluded, it is clear from the table that each of the remaining systems had queries returning incorrect number of results, or queries that timeout without returning any results. The advantage of R2DF is not emphasized in terms of SPARQL support, since this is mostly a function of system maturity and continued development.

Given Table 1, it is hard to make direct system comparisons. Still, when the R2DF system is compared with systems that can evaluate approximately the same queries, i.e., Virtuoso and Jena, then R2DF is in the worst case slightly faster, and in the best case, as much as an order of magnitude faster than the other two systems. So, for LUBM, R2DF is significantly faster than Virtuoso (2×) and Jena (4×). For SP2Bench, R2DF is on average times about 50% faster than Virtuoso, although Virtuoso has a better geometric mean (not shown due to space constraints), which reflects Virtuoso being much better on short running queries. For DBpedia, R2DF and Virtuoso have comparable performance, and for PRBench, R2DF is about 5.5× better than Jena. Jena is actually the only system that supports the same queries as R2DF, and across all datasets R2DF is in the worst case 60%, and in the best case as much as two orders of magnitude faster. A comparison between R2DF and RDF-3X is also possible, but only in the LUBM dataset where both systems support a similar number of queries. The two systems are fairly close in performance and out-perform the remaining three systems. When compared between themselves across 11 queries (RDF-3X did not run one query), R2DF is faster than RDF-3X in 3 queries, namely in LQ8, LQ13 and LQ14 (246 ms, 14 ms and 4.6 secs versus 573 ms, 36 ms and 9.5 secs, respectively), while RDF-3X has clearly an advantage in 3 other queries, namely in LQ2, LQ6, LQ10 (722 ms, 12 secs and 1.57 secs versus 20 secs, 33 secs and 3.42 secs, respectively). For the remaining 5 queries, the two systems have almost identical performance with RDF-3X being faster than R2DF by approximately 3 ms for each query.

Figure 9:
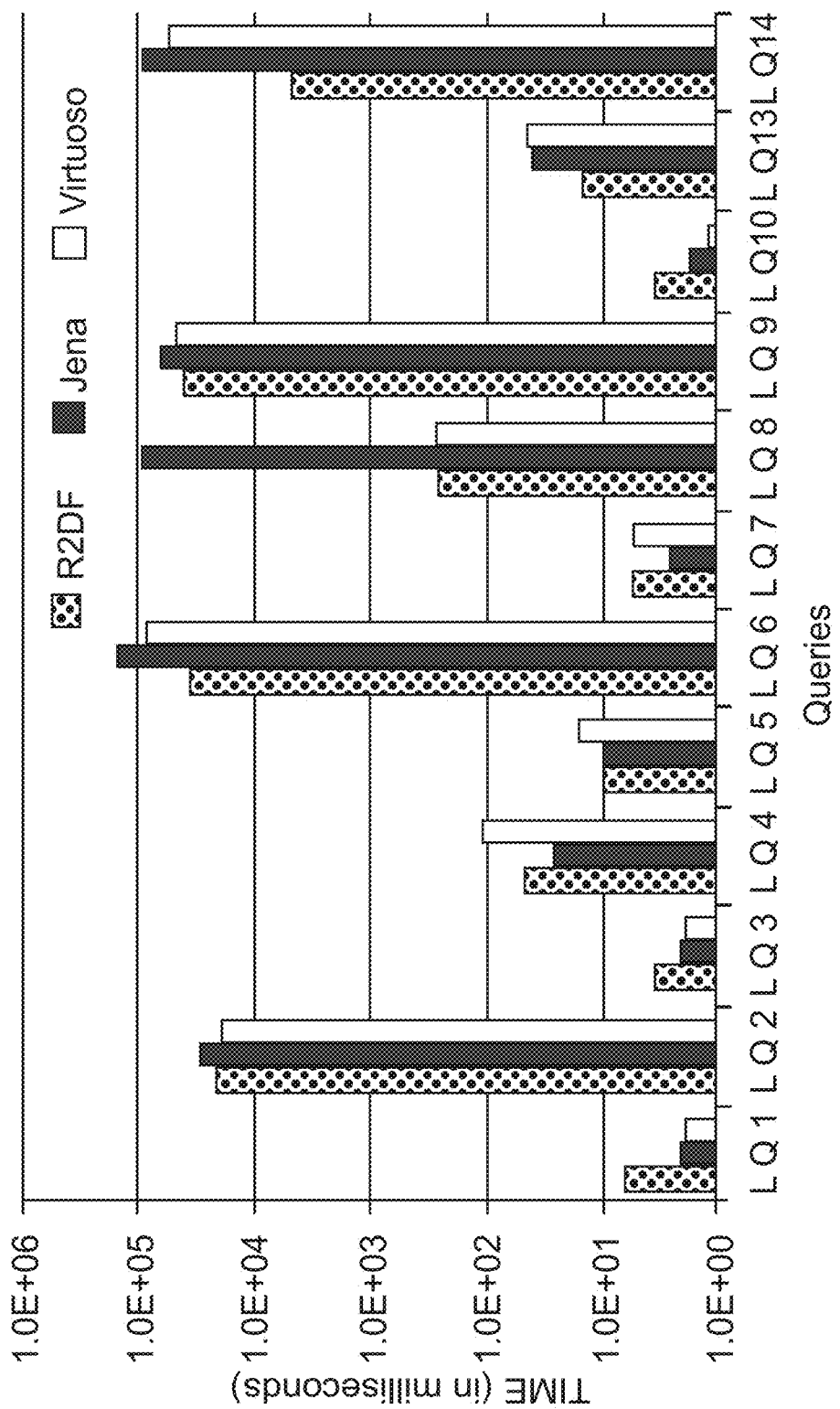
FIG. 9 is a graph illustrating LUBM benchmark results.

For a more detailed per-query comparison, FIG. 9 illustrates the running times for R2DF, Virtuoso and Jena for all 12 LUBM queries. Reported times are in milliseconds and the scale is logarithmic). Notice that R2DF outperforms the other systems in the long-running and complicated queries (e.g., LQ6, LQ8, LQ9, LQ13, LQ14). So, R2DF takes approximately 34 secs to evaluate LQ6, while Virtuoso requires 83.2 secs and Jena 150 secs. Similarly, R2DF takes 40 secs to evaluate LQ9, whereas Virtuoso requires 46 and Jena 60 secs. Most notably, in LQ14 R2DF requires 4.6 secs while Virtuoso requires 53 secs and Jena 94.1 sees. For the sub-second queries, R2DF is slightly slower than the other systems, but the difference is negligible at this scale. So, for LQ1, R2DF requires 5 ms, while Virtuoso requires 1.8 ms and Jena 2.1 ms. Similarly, for LQ3 R2DF requires 3.4 ms while Virtuoso takes 1.8 ms and Jena 2.0 ms.

Figure 10:
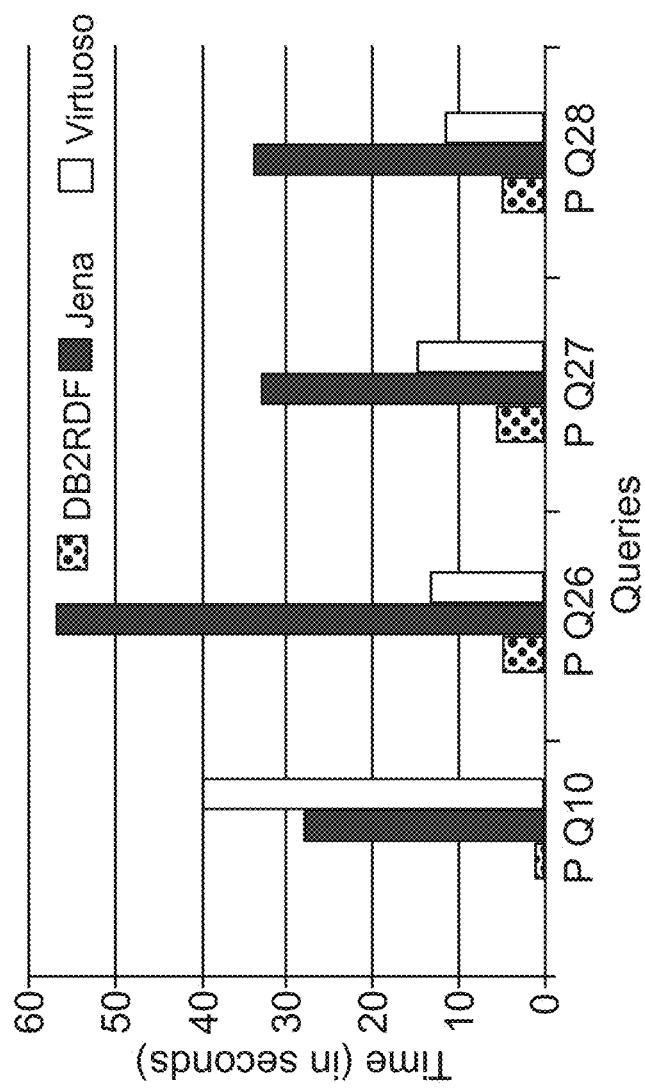
FIG. 10 is a graph illustrating PRBench sample of long-running queries.
Figure 11:
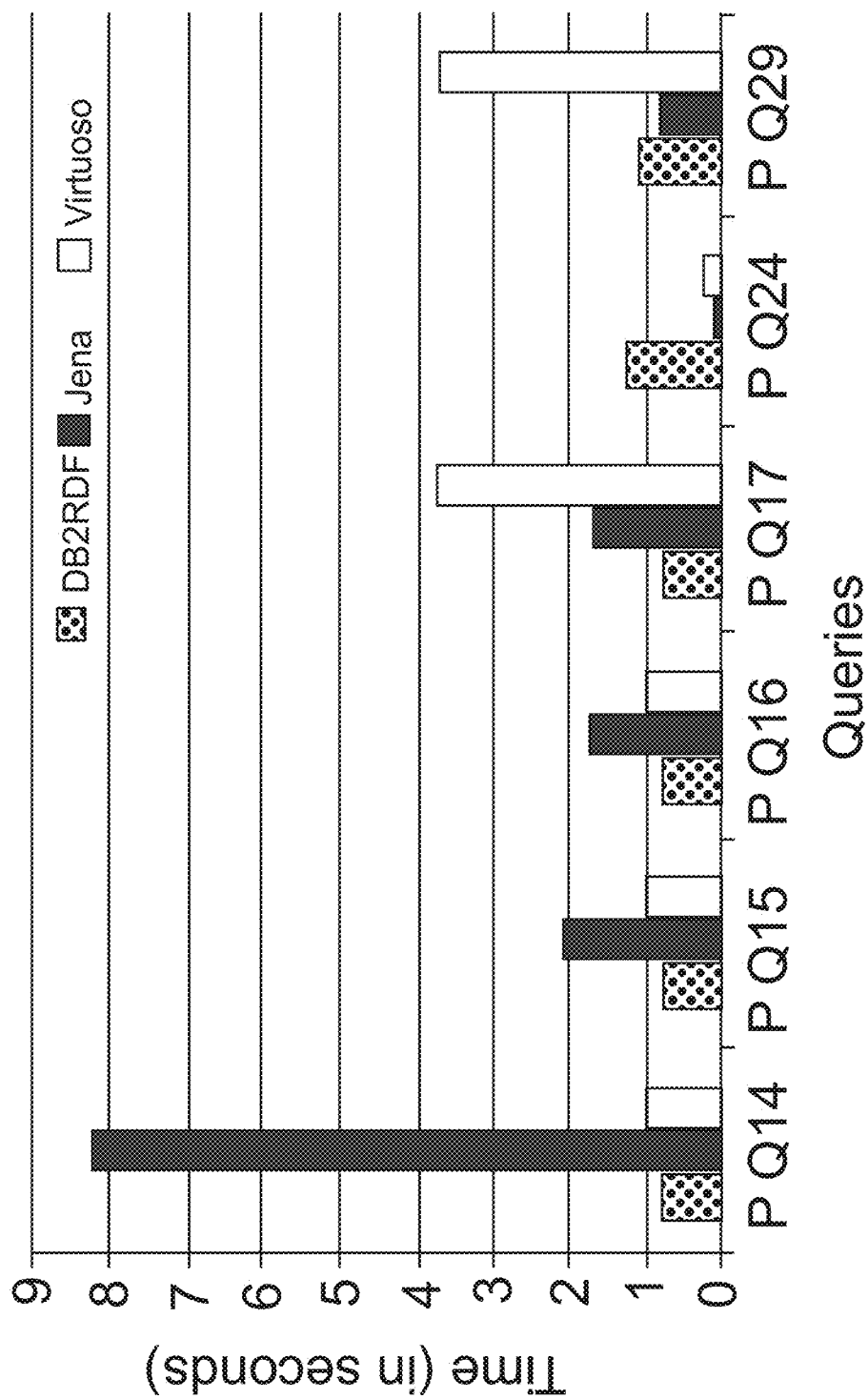
FIG. 11 is a graph illustrating PRBench sample of medium-running samples.

The situation is similar in the PRBench case. FIG. 10 shows the evaluation time of 4 long-running queries. Consistently, R2DF outperforms all other systems. For example, for PQ10 R2DF takes 3 ms, while Jena requires 27 seconds and Virtuoso requires 39 seconds. For each of the other three queries, R2DF takes approximately 4.8 secs while Jena requires a minimum of 32 and Virtuoso a minimum of 11 secs. FIG. 11 shows that the situation is similar for medium-running queries where R2DF consistently outperforms the competition.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for optimizing semantic web queries in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for optimizing semantic web queries, the method comprising:
   receiving a semantic query over a database, the semantic query comprising a plurality of triple patterns;
   creating a data flow graph that captures inter-relationships resulting from sharing of at least one of common variables and constraints among the plurality of triple patterns;
   using the data flow graph and costs estimates for traversing all triple patterns in the semantic query to determine an order of optimization of the plurality of triple patterns and a query plan for executing the semantic query; and
   using the query plan to evaluate the semantic query over the database;
   wherein the data flow graph comprises a plurality of triple pattern and access method pair nodes connected by a plurality of edges representing dependencies among execution of the triple patterns in the semantic query; and
   wherein each edge in the data flow graph comprises a cost associated with evaluating a given triple pattern by a given access method with respect to statistics of the database for a triple pattern and access pair node associated with that edge; and the step of using the data flow graph and costs estimates further comprises determining the order of optimization of the plurality of triple patterns and the query plan for executing the semantic query such that edges in an optimal flow tree through the data flow graph comprise a minimum cumulative cost.

2. The method of claim 1, wherein the method further comprises: using the query plan to create a structured query language query; and using the structured query language query to evaluate the semantic query over the database.

3. The method of claim 1, wherein:
   the optimal flow tree comprises a set of triple pattern and access method pair nodes and edges such that all triple patterns in the semantic query are contained in the optimal flow tree; and
   using the data flow graph and costs estimates to determine the query plan further comprises:
   creating an execution tree independent of a structure of the database, the execution tree comprising a sequence of evaluation of triple patterns in the optimal flow tree; and
   transforming the execution tree into the query plan that exploits the structure of the database.

4. The method of claim 3, wherein:
   the method further comprises expressing the semantic query as a query parse tree comprising a plurality of nodes, the nodes comprising the triple patterns from the semantic query and logical relationships among the triple patterns; and
   creating the execution tree further comprises:
      evaluating contents of each node in the parse tree sequentially starting with a root node in the parse tree for inclusion in the execution tree; and
      determining whether the contents of a given node are to be added to the execution tree immediately or held for inclusion in the execution tree after contents of other nodes are added to the execution tree.

5. The method of claim 4, wherein determining whether the contents of a given node are to be added immediately further comprises adding contents of each node at a latest possible point in the execution tree upon determination that variables or operators in contents are required for subsequent stages in the execution tree.

6. The method of claim 1, wherein creating the data flow graph further comprises: defining a root node in the data flow graph; selecting an access method from the plurality of triple pattern and access method pair nodes; identifying a triple pattern having a constant in at least one of a subject and an object that can be accessed by the selected access method and lacking any required variable, a required variable comprising a variable in the triple pattern that is required to be bound when evaluated by the selected access method by a prior triple pattern evaluation; and connecting a first triple pattern and access method pair to the root node comprising the selected access method and the identified triple pattern.

7. The method of claim 6, wherein creating the data flow graph further comprises: connecting subsequent triple pattern and access method pairs to the first triple pattern and access method pair by identifying a required variable in a subsequent triple pattern that is required to be bound by evaluation of the identified triple pattern when the subsequent triple pattern is evaluated by a subsequent selected access method.

8. The method of claim 7, wherein creating the data flow graph further comprises:
   calculating for the cost estimates a cost for evaluating a given triple pattern by a given access method with respect to the statistics of the database; and
   assigning the calculated cost to edges in the data flow graph associated with triple pattern and access pair nodes comprising the given triple pattern and the given access method.

9. A non-transitory computer-readable storage medium containing a computer-readable code that when read by a computer causes the computer to perform a method for optimizing semantic web queries, the method comprising:
   receiving a semantic query over a database, the semantic query comprising a plurality of triple patterns;
   creating a data flow graph that captures inter-relationships resulting from sharing of at least one of common variables and constraints among the plurality of triple patterns;
   using the data flow graph and costs estimates for traversing all triple patterns in the semantic query to determine an order of optimization of the plurality of triple patterns and a query plan for executing the semantic query; and
   using the query plan to evaluate the semantic query over the database;
   wherein the data flow graph comprises a plurality of triple pattern and access method pair nodes connected by a plurality of edges representing dependencies among execution of the triple patterns in the semantic query, each edge in the data flow graph comprises a cost associated with evaluating a given triple pattern by a given access method with respect to statistics of the database for a triple pattern and access pair node associated with that edge and the step of using the data flow graph and costs estimates further comprises determining the order of optimization of the plurality of triple patterns and the query plan for executing the semantic query such that edges in an optimal flow tree through the data flow graph comprise a minimum cumulative cost.

10. The non-transitory computer-readable storage medium of claim 9, wherein the method further comprises: using the query plan to create a structured query language query; and using the structured query language query to evaluate the semantic query over the database.

11. The non-transitory computer-readable storage medium of claim 9, wherein:
   the optical flow tree comprises a set of triple pattern and access method pair nodes and edges such that all triple patterns in the semantic query are contained in the optical flow tree; and
   using the data flow graph and costs estimates to determine the query plan further comprises:
      creating an execution tree independent of a structure of the database, the execution tree comprising a sequence of evaluation of triple patterns in the optimal flow tree; and
      transforming the execution tree into the query plan that exploits the structure of the database.

12. The non-transitory computer-readable storage medium of claim 11, wherein:
   the method further comprises expressing the semantic query as a query parse tree comprising a plurality of nodes, the nodes comprising the triple patterns from the semantic query and logical relationships among the triple patterns; and
   creating the execution tree further comprises:
      evaluating contents of each node in the parse tree sequentially starting with a root node in the parse tree for inclusion in the execution tree; and
      determining whether the contents of a given node are to be added to the execution tree immediately or held for inclusion in the execution tree after contents of other nodes are added to the execution tree.

13. The non-transitory computer-readable storage medium of claim 12, wherein determining whether the contents of a given node are to be added immediately further comprises adding contents of each node at a latest possible point in the execution tree upon determination that variables or operators in contents are required for subsequent stages in the execution tree.

14. The non-transitory computer-readable storage medium of claim 9, wherein creating the data flow graph further comprises: defining a root node in the data flow graph; selecting an access method from the plurality of triple pattern and access method pair nodes; identifying a triple pattern having a constant in at least one of a subject and an object that can be accessed by the selected access method and lacking any required variable, a required variable comprising a variable in the triple pattern that is required to be bound when evaluated by the selected access method by a prior triple pattern evaluation; and connecting a first triple pattern and access method pair to the root node comprising the selected access method and the identified triple pattern.

15. The non-transitory computer-readable storage medium of claim 14, wherein creating the data flow graph further comprises: connecting subsequent triple pattern and access method pairs to the first triple pattern and access method pair by identifying a required variable in a subsequent triple pattern that is required to be bound by evaluation of the identified triple pattern when the subsequent triple pattern is evaluated by a subsequent selected access method.

16. The non-transitory computer-readable storage medium of claim 15, wherein creating the data flow graph further comprises:
   calculating for the cost estimates a cost for evaluating a given triple pattern by a given access method with respect to the statistics of the database; and
   assigning the calculated cost to edges in the data flow graph associated with triple pattern and access pair nodes comprising the given triple pattern and the given access method.

* * * * *